(12) United States Patent
Hammarlund et al.

(10) Patent No.: US 8,984,199 B2
(45) Date of Patent: Mar. 17, 2015

(54) INTER-PROCESSOR INTERRUPTS

(75) Inventors: Per Hammarlund, Hillsboro, OR (US); James B. Crossland, Banks, OR (US); Shivnandan D. Kaushik, Portland, OR (US); Anil Aggarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/631,522

(22) Filed: Jul. 31, 2003

(65) Prior Publication Data
US 2005/0027914 A1 Feb. 3, 2005

(51) Int. Cl.
*G06F 13/24* (2006.01)
*G06F 13/32* (2006.01)
*G06F 9/48* (2006.01)
*G06F 9/54* (2006.01)

(52) U.S. Cl.
CPC .............. *G06F 9/4812* (2013.01); *G06F 9/544* (2013.01)
USPC .......................................... 710/260; 710/269

(58) Field of Classification Search
USPC .......... 710/100, 108, 309, 260–269; 711/141; 712/30; 709/213, 215, 230; 719/313; 324/719; 713/1; 714/11; 370/46
See application file for complete search history.

(56) References Cited

U.S. PATENT DOCUMENTS

| | | | | |
|---|---|---|---|---|
| 4,349,872 A | * | 9/1982 | Fukasawa et al. | 710/262 |
| 4,365,294 A | * | 12/1982 | Stokken | 713/502 |
| 4,514,825 A | * | 4/1985 | Nordling | 379/93.31 |
| 4,604,500 A | * | 8/1986 | Brown et al. | 379/269 |
| 4,713,770 A | * | 12/1987 | Hayes et al. | 700/175 |
| 4,740,910 A | * | 4/1988 | Sakata et al. | 710/108 |
| 4,768,149 A | * | 8/1988 | Konopik et al. | 710/47 |
| 4,930,070 A | * | 5/1990 | Yonekura et al. | 710/262 |
| 5,123,094 A | * | 6/1992 | MacDougall | 712/30 |
| 5,136,714 A | * | 8/1992 | Braudaway et al. | 710/260 |
| 5,142,683 A | * | 8/1992 | Burkhardt et al. | 709/215 |
| 5,146,597 A | * | 9/1992 | Williams | 710/268 |
| 5,214,759 A | * | 5/1993 | Yamaoka et al. | 709/213 |
| 5,283,904 A | * | 2/1994 | Carson et al. | 710/266 |
| 5,303,378 A | * | 4/1994 | Cohen | 710/264 |

(Continued)

FOREIGN PATENT DOCUMENTS

| | | | | |
|---|---|---|---|---|
| DE | 69221986 | | 4/1993 | |
| EP | 431326 A2 | * | 6/1991 | G06F 9/46 |

(Continued)

OTHER PUBLICATIONS

"NB9011428: Low-Synchronization Translation Lookaside Buffer Consistency Algorithm", Nov. 1, 1990, IBM, IBM Technical Disclosure Bulletin, vol. 33, Iss. 6B, pp. 428-433.*

(Continued)

*Primary Examiner* — Faisal M Zaman
(74) *Attorney, Agent, or Firm* — Blakely, Sokoloff, Taylor & Zafman LLP

(57) ABSTRACT

According to an embodiment of the invention, a method and apparatus for inter-processor interrupts in a multi-processor system are described. An embodiment comprises writing an inter-processor interrupt request to a first memory location; monitoring the first memory location; detecting the inter-processor interrupt request in the first memory location; calling a function for the inter-processor interrupt request; and performing the function for the inter-processor interrupt request.

15 Claims, 6 Drawing Sheets

(56) References Cited

U.S. PATENT DOCUMENTS

| | | | |
|---|---|---|---|
| 5,410,654 A * | 4/1995 | Foster et al. | 711/147 |
| 5,410,710 A * | 4/1995 | Sarangdhar et al. | 710/266 |
| 5,524,208 A * | 6/1996 | Finch et al. | 714/25 |
| 5,535,397 A * | 7/1996 | Durante et al. | 710/267 |
| 5,544,051 A * | 8/1996 | Senn et al. | 1/1 |
| 5,553,293 A * | 9/1996 | Andrews et al. | 710/261 |
| 5,717,895 A * | 2/1998 | Leedom et al. | 711/140 |
| 5,765,195 A * | 6/1998 | McDonald | 711/141 |
| 5,781,187 A * | 7/1998 | Gephardt et al. | 710/309 |
| 5,848,279 A * | 12/1998 | Wu et al. | 710/268 |
| 5,864,701 A * | 1/1999 | Col et al. | 710/260 |
| 5,918,028 A * | 6/1999 | Silverthorn et al. | 710/306 |
| 5,966,543 A * | 10/1999 | Hartner et al. | 710/200 |
| 5,974,486 A * | 10/1999 | Siddappa | 710/53 |
| 5,978,865 A * | 11/1999 | Hansen et al. | 710/22 |
| 5,983,356 A * | 11/1999 | Pandey et al. | 713/322 |
| 6,041,374 A * | 3/2000 | Postman et al. | 710/73 |
| 6,047,391 A | 4/2000 | Younis et al. | |
| 6,088,783 A * | 7/2000 | Morton | 712/22 |
| 6,128,732 A * | 10/2000 | Chaiken | 713/2 |
| 6,145,007 A * | 11/2000 | Dokic et al. | 709/230 |
| 6,148,361 A * | 11/2000 | Carpenter et al. | 710/260 |
| 6,173,358 B1 * | 1/2001 | Combs | 711/100 |
| 6,192,441 B1 * | 2/2001 | Athenes et al. | 710/262 |
| 6,247,091 B1 * | 6/2001 | Lovett | 710/260 |
| 6,247,143 B1 * | 6/2001 | Williams | 714/11 |
| 6,249,830 B1 * | 6/2001 | Mayer et al. | 710/113 |
| 6,265,885 B1 * | 7/2001 | Luo et al. | 324/719 |
| 6,269,419 B1 * | 7/2001 | Matsuyama | 710/269 |
| 6,279,067 B1 * | 8/2001 | Callway et al. | 710/260 |
| 6,295,573 B1 * | 9/2001 | Bailey et al. | 710/260 |
| 6,317,826 B1 * | 11/2001 | McCall et al. | 713/1 |
| 6,339,808 B1 * | 1/2002 | Hewitt et al. | 710/260 |
| 6,356,963 B1 * | 3/2002 | Maguire et al. | 710/48 |
| 6,378,023 B1 * | 4/2002 | Christie et al. | 710/260 |
| 6,393,503 B2 * | 5/2002 | Fishler et al. | 710/100 |
| 6,418,496 B2 * | 7/2002 | Pawlowski et al. | 710/264 |
| 6,459,706 B1 * | 10/2002 | Hayasaka | 370/466 |
| 6,625,679 B1 * | 9/2003 | Morrison et al. | 710/260 |
| 6,665,761 B1 * | 12/2003 | Svenkeson et al. | 710/268 |
| 6,691,190 B1 * | 2/2004 | Burroughs et al. | 710/100 |
| 6,799,317 B1 * | 9/2004 | Heywood et al. | 719/313 |
| 6,898,703 B1 * | 5/2005 | Ogami et al. | 713/2 |
| 6,920,516 B2 * | 7/2005 | Hartwell et al. | 710/263 |
| 6,931,643 B2 * | 8/2005 | Gardner | 719/313 |
| 7,080,205 B2 * | 7/2006 | Demharter | 711/119 |
| 7,240,137 B2 * | 7/2007 | Aguilar et al. | 710/269 |
| 7,296,271 B1 * | 11/2007 | Chalmer et al. | 718/108 |
| 7,350,006 B2 * | 3/2008 | Yasue et al. | 710/264 |
| 7,433,985 B2 * | 10/2008 | Ayyar et al. | 710/260 |
| 7,788,669 B2 * | 8/2010 | England et al. | 718/104 |
| 2003/0028696 A1 * | 2/2003 | Catherwood et al. | 710/260 |
| 2003/0037244 A1 * | 2/2003 | Goodman et al. | 713/189 |
| 2003/0055900 A1 * | 3/2003 | Glas et al. | 709/205 |
| 2003/0126186 A1 | 7/2003 | Rodgers et al. | |
| 2003/0126375 A1 | 7/2003 | Hill et al. | |
| 2003/0126379 A1 | 7/2003 | Kaushik et al. | |
| 2004/0117534 A1 * | 6/2004 | Parry et al. | 710/260 |
| 2004/0122997 A1 * | 6/2004 | Diamant | 710/49 |
| 2011/0271060 A1 * | 11/2011 | Richardson et al. | 711/147 |
| 2011/0307641 A1 * | 12/2011 | Ganguly | 710/262 |
| 2012/0260017 A1 * | 10/2012 | Mine et al. | 710/308 |

FOREIGN PATENT DOCUMENTS

| | | | | |
|---|---|---|---|---|
| EP | 0431326 A2 * | 6/1991 | | G06F 15/167 |
| EP | 0538829 | 4/1992 | | |
| EP | 0526930 A1 * | 2/1993 | | G06F 12/08 |
| EP | 526930 A1 * | 2/1993 | | G06F 12/08 |
| EP | 1 265 148 A1 * | 12/2002 | | G06F 13/24 |
| JP | 03042762 A * | 2/1991 | | G06F 15/16 |
| JP | 03212755 A | 9/1991 | | |
| JP | 06-12387 | * | 1/1994 | G06F 15/16 |
| KR | 20010027944 A * | 4/2001 | | G06F 15/167 |
| WO | WO 2009134217 A1 * | 11/2009 | | G06F 13/24 |

OTHER PUBLICATIONS

Moon-Seek Chang; Kern Koh, "Lazy TLB consistency for large-scale multiprocessors," Parallel Algorithms/Architecture Synthesis, 1997. Proceedings., Second Aizu International Symposium , pp. 308-315, Mar. 17-21, 1997.* van der Wal, A.J.; van Dijk, G.J.W., "Efficient interprocessor communication in a tightly-coupled homogeneous multiprocessor system," Distributed Computing Systems, 1990. Proceedings., Second IEEE Workshop on Future Trends of , pp. 362-368, Sep. 30-Oct. 2, 1990.*

Alberi, J.L., "A Method of Interprocessor Communication for a Multiprocessor Environment," Nuclear Science, IEEE Transactions on , vol. 29, No. 1, pp. 84-86, Feb. 1982.*

Silberschatz A. et al.; "Operating System Concepts", Fourth Edition, 1994, pp. 23-35, XP 002328940, p. 31, lin 6-line 9.

Katsuki D. et al.; "Pluribuspan operatoinal fault-tolerant Multiprocessor", Proceedings of the IEEE USA, vol. 66, No. 10, Oct. 1978, pp. 1146-1159, XP002344146.

Intel, Prescott New Instructions Software Developer's Guide, Jun. 2003.

Intel—Mar. 2003—Intel Itanium Processor Family Interrupt Architecture Guide.

Intel—Oct. 2002—Intel Itanium Architecture Software Developer's Manual—vol. 2: System Architecture Rev 2.1.

GPTO, "OA Mailed Dec. 17, 2007 for German Patent Application 112004001418.2 53", (Dec. 17, 2007), Whole Document.

KPTO, "OA Mailed Feb. 29, 2008 for Korean Patent Application 10-2006-7002136", (Feb. 29, 2008), Whole Document.

KPTO, "OA Mailed May 31, 2007 for Korean Patent Application 10-2006-7002136", (May 31, 2007), Whole Document.

PTO, "IST and WO Mailed Sep. 29, 2005 for PCT/US2004/023570", (Sep. 29, 2005), Whole Document.

TW PTO, "OA Mailed Aug. 12, 2005 for TW Patent Application 93122148", (Aug. 12, 2005), Whole Document.

"German Patent Application 11 2004 001 418.2-53 Office Action Mailed Jan. 9, 2007", (Jan. 9, 2007).

"German Patent Application 112004001418.2-53 English Translation of OA Mailed Jan. 9, 2007", (Mar. 5, 2007), Whole Document.

Office action received for Japanese Patent Application No. 2006-521923, mailed on Feb. 24, 2009, 4 pages and English translation of 3 pages.

Office Action from counterpart German Patent Application No. 11 2004 001418.2, mailed Jun. 29, 2011, 6 pages, English Summary included.

Office Action from counterpart Chinese Patent Application No. 200810187079.8, mailed Jul. 11, 2011X, 18 pages, English Summary included.

Office Action from counterpart Chinese Patent Application No. 200810187079.8, mailed Apr. 10, 2013, 7 pages, English Summary included.

Office Action for Chinese Patent Application No. 200810187079.8, Mailed May 6, 2014, 10 pages.

Office Action from Counterpart Chinese Patent Application No. 200810187079.8, Mailed Aug. 8, 2014, 2 pages.

* cited by examiner

INTER-PROCESSOR INTERRUPTS

FIELD

An embodiment of the invention relates to computer operation in general, and more specifically to inter-processor interrupts.

BACKGROUND

A computer may include multiple processors, which may include physical and logical processors. Operating systems may utilize inter-processor interrupts (IPIs) to transfer requests between processors in a system. An operating system may use an inter-processor interrupts in order to have one processor initiate specific actions for one or more other processors. Such actions may include a TLB (translation lookaside buffer) shootdown interrupt, in which a processor sends an interrupt to other processor to request invalidation of a TLB entry. Cache flushing may be initiated by receiving processors in response to a global change made by a sending processor, such as changes in the linear address mappings or changes in the memory caching attributes for a particular memory range.

However, inter-processor interrupt signals may require a large overhead for both the sending processor side and the receiving processor side. The sending processor needs to perform memory accesses to send an interrupt through a programmable interrupt controller, such as a local advanced programmable interrupt controller (APIC). In turn, the receiving processor may absorb considerable overhead in the process of receiving an interrupt.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus are described for inter-processor interrupts in a multi-processor system.

Under an embodiment of the invention, an inter-processor interrupt function is performed using an instruction for calling the interrupt. The instruction is referred to herein as an Mcall instruction, although the instruction can have any designation. In the embodiment, the operational cost of the function to the sending processor side is a store to a writeback memory location, with the cost to the receiving side being a forced call to a function. An embodiment of the invention may greatly reduce the operational cost of inter-processor interrupts, thereby improving system performance.

According to an embodiment of the invention, an interrupt function is performed by a signal that is sent through the memory system. The sending processor performs a store to a writeback memory location. The store thereby triggers a function call on the receiving side. The operation may be contrasted to a conventional interrupt that is sent through the APIC. The embodiment may allow improved operating system performance in multi-processor and multi-threaded environments by reducing the cost of sending inter-processor interrupts. Under an embodiment of the invention, an inter-processor interrupt function may be performed without an APIC or in systems with alternative signal operations.

Figure 1:
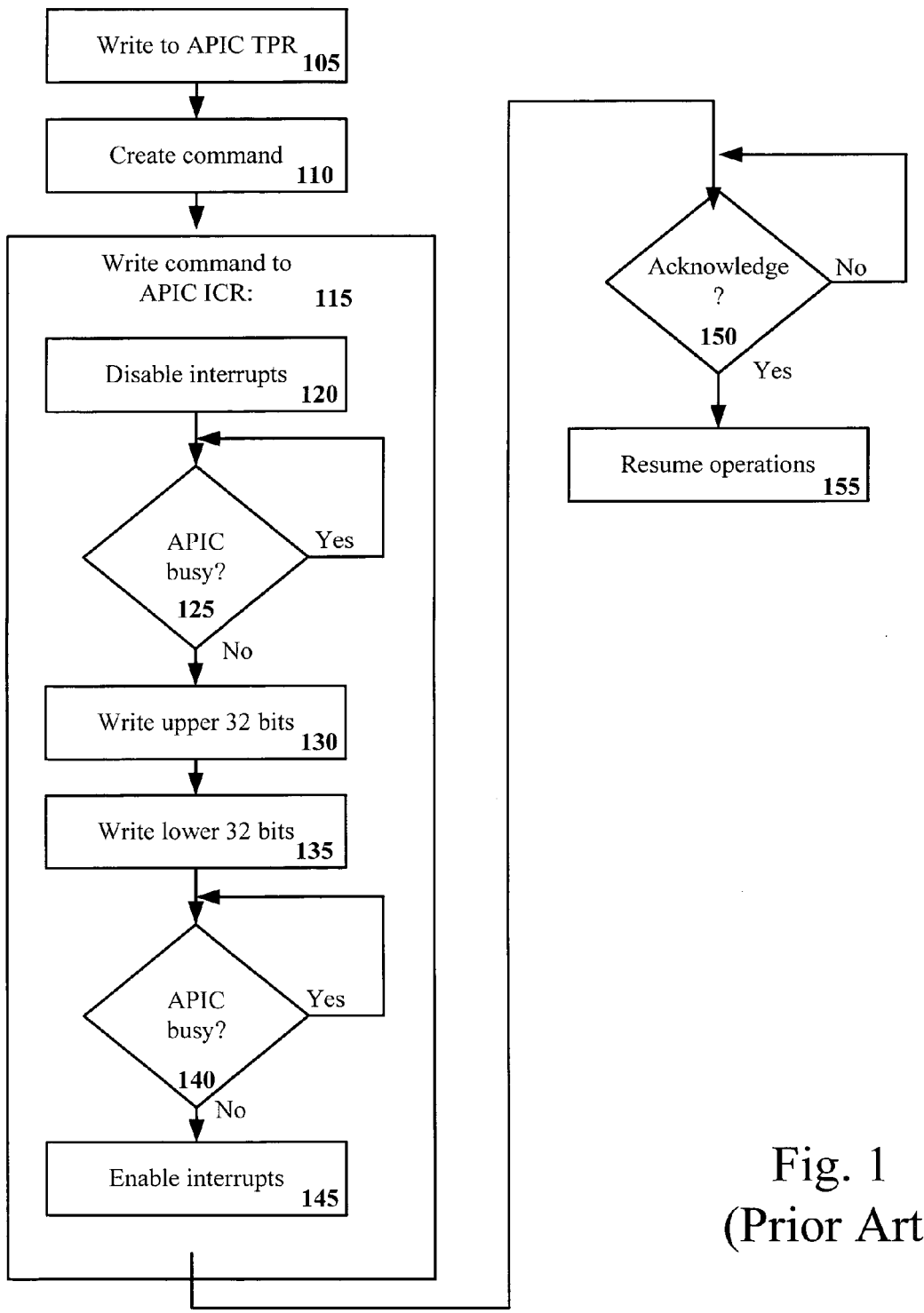
FIG. 1 illustrates a sending processor sequence.

A conventional mechanism for sending an inter-processor interrupt is illustrated in FIG. 1. In this illustration, a first initiating or sending processor provides an interrupt to a second receiving or target processor. The example provided in FIG. 1 concerns a 64-bit command written in two 32-bit write operations. In this sequence, the first processor performs the following tasks:

1. Raise interrupt request level (IRQL) via write to the processor local APIC task priority register 105. This is a write to a non-cached location.
2. Create (in a memory location or register) a command to write to the processor local APIC interrupt command register 110. Among other parameters, this command specifies the target processors and the interrupt vector V to be used for interrupting the target processor. Interrupt vector V would correspond to the interrupt service routine that would be executed on the target processor in response to sending the inter-processor interrupt.
3. Write the command to the processor local APIC interrupt command register (ICR) 115. This is a write to a non-cached location. The process for writing the command may include:
   a. Disable operation of interrupts 120.
   b. Wait for the local APIC to be not busy 125. This may be done by polling on the BUSY bit in the interrupt command register.
   c. Write the upper 32 bits of the command to the APIC interrupt command register High word 130.
   d. Write the lower 32 bits of the command to the APIC interrupt command register Low word 135.
   e. Wait for the local APIC to be not busy 140.
   f. Re-enable interrupt operation 145.
4. Wait for the target processor to acknowledge receipt of the inter-processor interrupt via a write of a particular data value to a particular memory location 150. This write would occur as part of servicing of the interrupt just sent on the target processors.
5. Resume normal operation 155.

On the receiving processor, the interrupt is conventionally latched and delivered to the processor core via logic incorporated in the local APIC interrupt delivery mechanism. The illustrated interrupt mechanism takes into account the interrupt priority under which the processor core is operating (as is reflected in an APIC task priority register), other pending interrupts that may have higher priority, and the interruptibility state of the processor's core. When the processor core has interrupts enabled and the vector corresponding to the inter-processor interrupt is the highest priority interrupt vector pending, then the local APIC dispatches the vector to the core.

Figure 2:
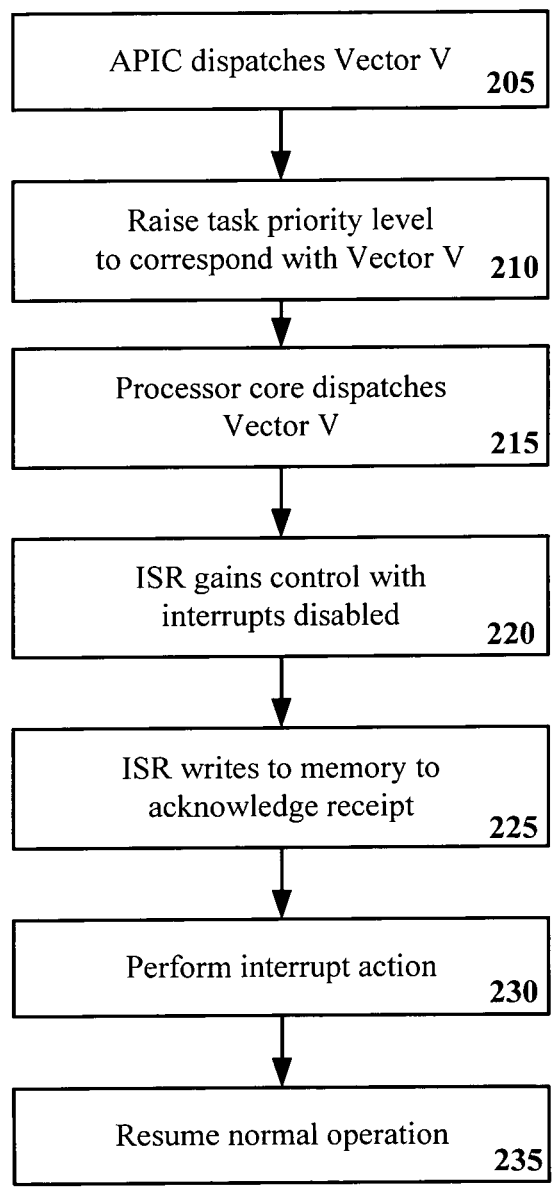
FIG. 2 illustrates a receiving processor sequence.

For a receiving processor, a conventional sequence of events is illustrated in FIG. 2. The inter-processor interrupt process for the receiving processor may include:

1. The processor's local APIC dispatches the interrupt vector V 205, which corresponds to the interrupt service routine (ISR) to the processor core. At boot time, the OS would have programmed the interrupt descriptor table entry corresponding to the vector V to contain an interrupt gate with the interrupt service routine.

2. Raises the task priority register level to a level corresponding to the vector V 210.
3. The processor core dispatches the vector V via the interrupt descriptor table 215.
4. The interrupt service routine corresponding to the inter-processor interrupt gains control with interrupts disabled 220.
5. The interrupt service routine writes to a memory location to signal to the sending processor the receipt of the inter-processor interrupt 225.
6. Perform the action for the inter-processor interrupt 230.
7. Resume normal operation 235.

Under an embodiment of the invention, the use of an instruction (a Mcall instruction in this description) for the operation of an interrupt may simplify the operational sequence for the sending processor and the receiving processor. At boot time, each processor in a multi-processor system may register a function, the function corresponding to an interrupt service routine that would have executed in kernel mode on receipt of an interrupt service routine, such as the inter-processor interrupt function via a Mcall instruction. However, this operation may alternately be accomplished by other mechanisms, including the use of model specific registers.

Figure 3:
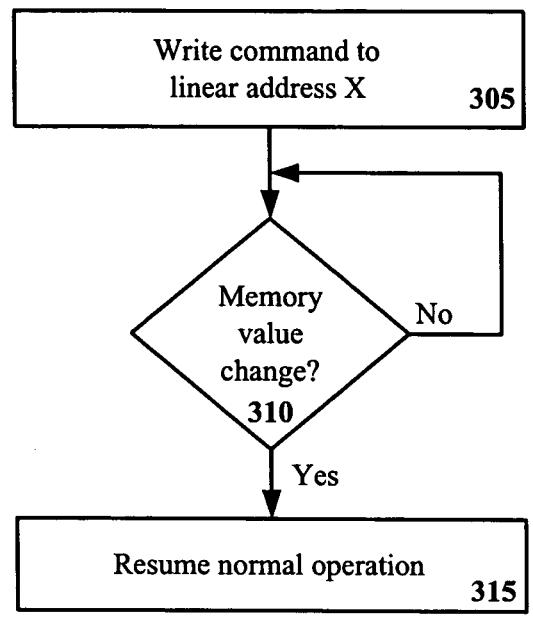
FIG. 3 is illustrates an embodiment of a sending processor sequence.

FIG. 3 is an illustration of an embodiment of an inter-processor interrupt sequence for a sending processor. A process for a sending processor may comprise:
1. Performing a memory write of the inter-processor interrupt request to a linear address X 305.
2. Waiting for the receiving processor to acknowledge receipt of the inter-processor interrupt by polling a particular memory location to determine whether the value changes 310. The value change occurs via a write as part of servicing of the interrupt on the receiving processor. This operation is not needed for transmission of an inter-processor interrupt, and in some embodiments operations may resume without polling a memory location or receiving acknowledgement of receipt of the interrupt.
3. When the memory location has changes values, resuming normal operation 315.

The example shown in FIG. 3 illustrates an example in which an interrupt is sent to one receiving processor. An inter-processor interrupt may be sent to multiple processors. In one embodiment, multiple processors monitor a single memory location to detect inter-processor interrupts. In another embodiment, each processor may monitor separate memory locations. If an inter-processor interrupt is sent to multiple target processors, then the sending processor may perform a write to a memory location monitored by the processors, or may perform multiple writes, writing to each of the addresses that the target processors are monitoring. Under an embodiment of the invention, each write performed is to a cached memory location, thus being significantly faster than writes to uncached task priority register addresses in a conventional sequence.

Figure 4:
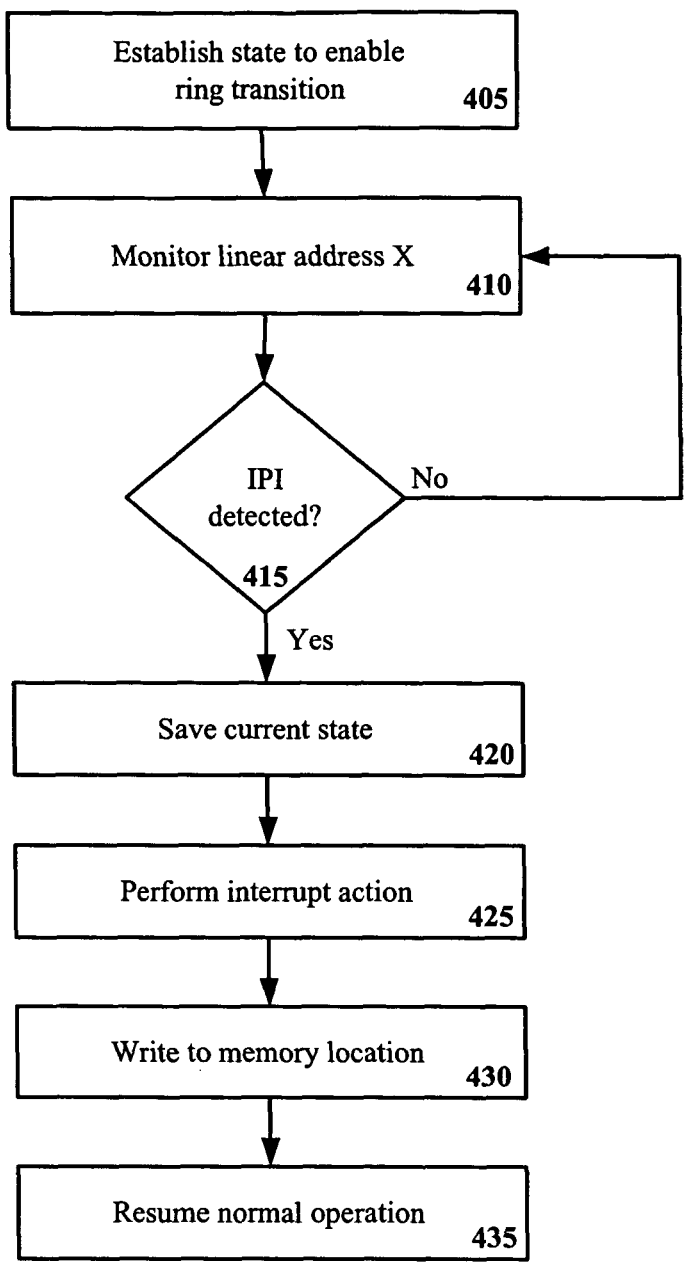
FIG. 4 is illustrates an embodiment of a receiving processor sequence.

FIG. 4 is an illustration for a receiving processor sequence. Under an embodiment of the invention, the receiving processor operation for inter-processor interrupts using the Mcall operation may comprise:
1. In kernel mode, establish a state for enabling ring transition on receipt of inter-processor interrupt 405.
2. Monitor memory location <Linear Address X> 410. A write to the memory location signifies an inter-processor interrupt request.
3. Upon detection of inter-processor interrupt in either user mode or in kernel mode 415, save the current state 420.
4. Perform the interrupt, Mcall <EPI ISR Linear Address> 425.
5. The performance of the function may include writing to a memory location being polled by the sending processor 430.
6. Resume normal operation 435.

Under this embodiment, the Mcall instruction puts the receiving processor in a state in which the processor monitors the linear address X for writes and, upon detection of a write operation, the receiving processor transfers execution control to the IPI ISR linear address. A ring transition is performed as needed, with the appropriate state established on the stack and the processor priority level raised to the appropriate priority.

Figure 5:
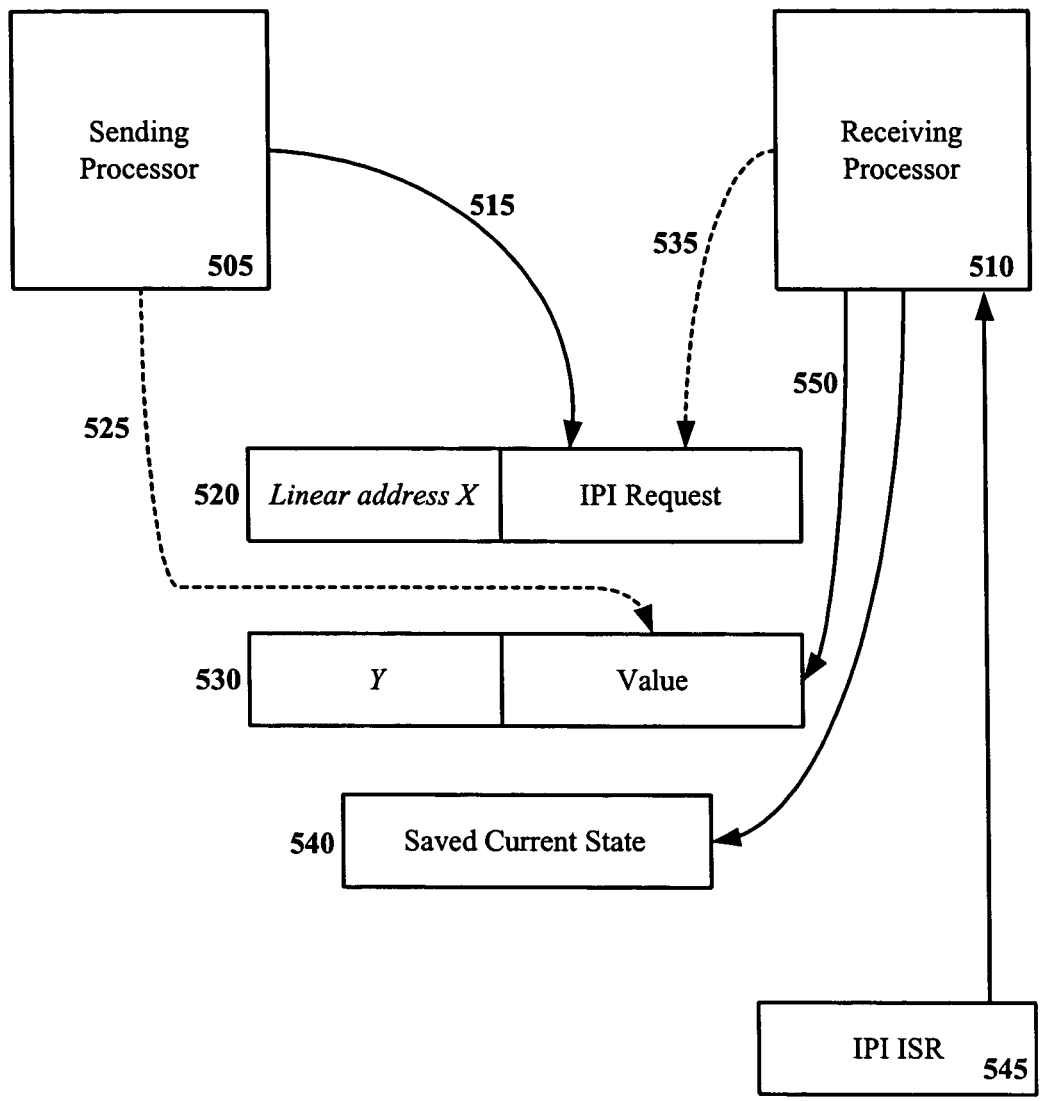
FIG. 5 demonstrates an embodiment of an inter-processor interrupt sequence.

FIG. 5 illustrates an embodiment of a sequence between a first sending processor and a second receiving processor. In this illustration, the sending processor 505 is sending an inter-processor interrupt to the receiving processor 510. In other illustrations, an interrupt may be sent to multiple processors. The sending processor 505 writes an inter-processor interrupt request 515 to an address designated in the figure as linear address X 520. Linear address X 520 is monitored 535 by the receiving processor 510. The sending processor 505 then may poll 525 a memory location designated in the illustration as Y 530. A change in value in memory location Y 530 indicates an acknowledgment of receipt of the interrupt request by receiving processor 510. However, receiving acknowledgement is not necessary for transmission of the inter-processor interrupt request, and in some embodiments the sending processor 505 may commence normal operations without polling a memory location or receiving an acknowledgement.

The receiving processor 510 monitoring 535 the linear address X 520 is notified of the interrupt request when a write to linear address X 520 occurs. In kernel mode, the receiving processor will have established a state for enabling ring transition on receipt of an inter-processor interrupt. When the interrupt is received, the current state of the receiving processor is saved 540. The linear processor performs the interrupt, with the call for the interrupt being shown as Mcall <IPI ISR Linear Address> 545. The performance of the function may include writing 550 to the memory location Y 530 being polled 525 by the sending processor 505. Upon detecting a change in value in memory location Y 530, the sending processor may resume normal operation. Upon completing the inter-processor interrupt, the receiving processor may resume normal operation.

Figure 6:
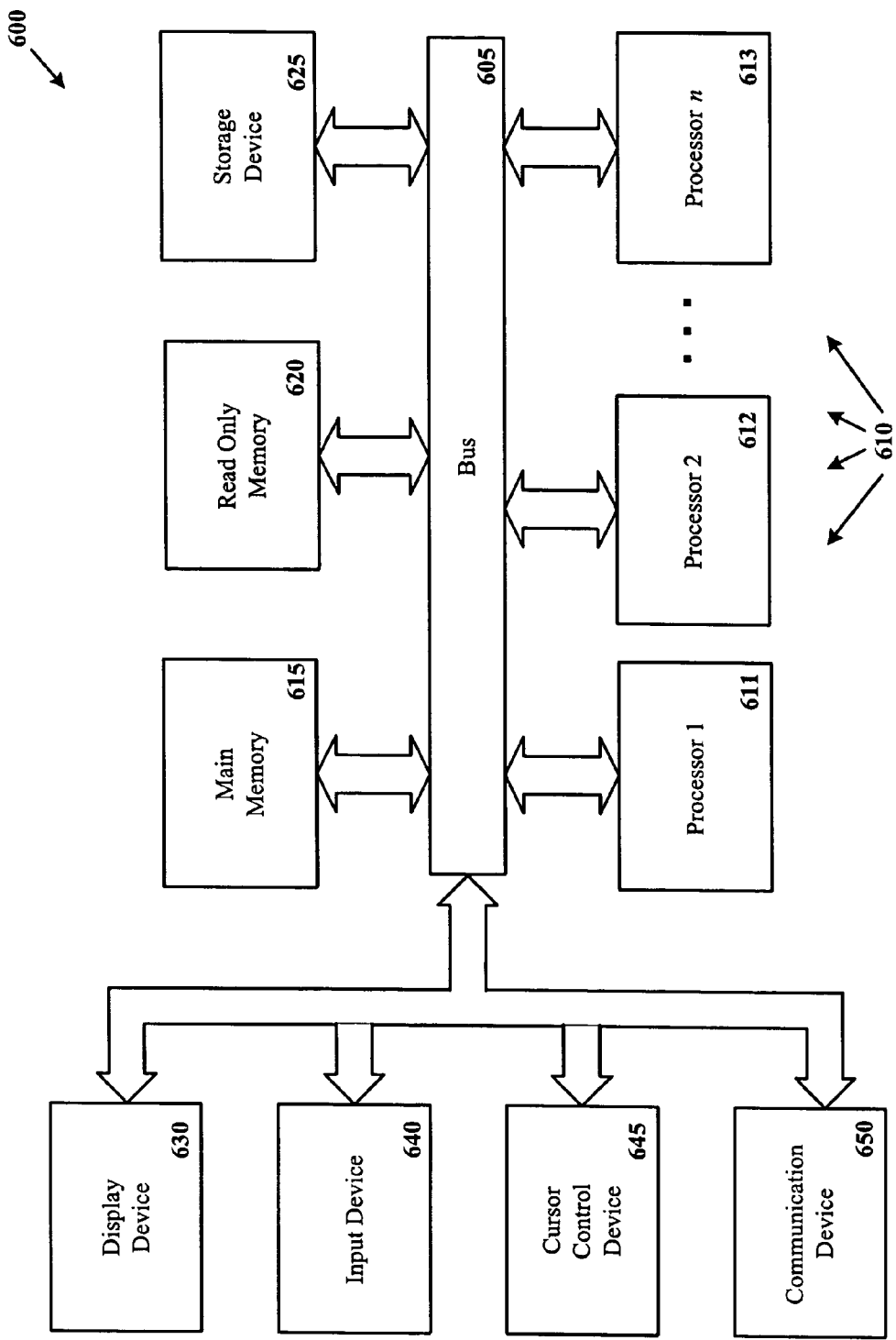
FIG. 6 illustrates an embodiment of a multi-processor computer.

Techniques described here may be used in many different environments. FIG. 6 is block diagram of an exemplary computer that can be used in conjunction with an embodiment of the invention. Under an embodiment of the invention, the computer may comprise an embedded system or other special purpose computer. An embedded system or other special purpose computer may operate without certain of the components and features described herein.

Under an embodiment of the invention, a computer 600 comprises a bus 605 or other communication means for communicating information, and a processing means such as one or more processors 610 (shown as 611, 612 and continuing through 613) coupled with the first bus 605 for processing information. Any of the processors 610 may provide an inter-processor interrupt to one or more of the other processors. Each processor may comprise an execution unit and logic for inter-processor interrupt operation.

The computer 600 further comprises a random access memory (RAM) or other dynamic storage device as a main memory 615 for storing information and instructions to be executed by the processors 610. Main memory 615 also may be used for storing temporary variables or other intermediate information during execution of instructions by the processors 610. The computer 600 also may comprise a read only memory (ROM) 620 and/or other static storage device for storing static information and instructions for the processor 610.

A data storage device 625 may also be coupled to the bus 605 of the computer 600 for storing information and instructions. The data storage device 625 may include a magnetic disk or optical disc and its corresponding drive, flash memory or other nonvolatile memory, or other memory device. Such elements may be combined together or may be separate components, and utilize parts of other elements of the computer 600.

The computer 600 may also be coupled via the bus 605 to a display device 630, such as a liquid crystal display (LCD) or other display technology, for displaying information to an end user. In some environments, the display device may be a touch-screen that is also utilized as at least a part of an input device. In some environments, display device 630 may be or may include an auditory device, such as a speaker for providing auditory information. An input device 640 may be coupled to the bus 605 for communicating information and/or command selections to the processor 610. In various implementations, input device 640 may be a keyboard, a keypad, a touch-screen and stylus, a voice-activated system, or other input device, or combinations of such devices. Another type of user input device that may be included is a cursor control device 645, such as a mouse, a trackball, or cursor direction keys for communicating direction information and command selections to processor 610 and for controlling cursor movement on display device 630.

A communication device 650 may also be coupled to the bus 605. Depending upon the particular implementation, the communication device 650 may include a transceiver, a wireless modem, a network interface card, or other interface device. The computer 600 may be linked to a network or to other devices using the communication device 650, which may include links to the Internet, a local area network, or another environment.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
    monitoring a first memory location by a first processor;
    writing, by a second processor, an inter-processor interrupt request to the first memory location, wherein the first and second processors are general purpose processors of same type within a multi-processor computer system;
    detecting, by the first processor, the inter-processor interrupt request in the first memory location, the first processor saving its state and executing a call instruction in response to the detecting, the call instruction specifying an address of an interrupt service routine to invoke said interrupt service routine, said address of said interrupt service routine having been made available to said first processor through a boot-up registration process;
    performing, by the first processor, the interrupt service routine for the inter-processor interrupt request;
    monitoring, by the second processor, a second, different memory location for acknowledgement of receipt of the inter-processor interrupt request; and
    writing, by the first processor, to the second, different memory location to acknowledge receipt of the inter-processor interrupt request,
    wherein the first memory location is accessible by a plurality of first processors, the plurality of first processors to monitor the first memory location to detect the inter-processor interrupt request, the first memory location being a single memory address.

2. The method of claim 1, further comprising establishing by the first processor, a state for enabling ring transition on detection of the inter-processor interrupt request.

3. The method of claim 1, wherein the first memory location is a linear memory location.

4. The method of claim 1, wherein the first memory location is accessible by the first processor to monitor the first memory location.

5. The method of claim 1, further comprising writing, by the second processor, the inter-processor interrupt request to a plurality of memory locations, each of the plurality of memory locations to be monitored by one or more processors.

6. The method of claim 1, wherein the memory write to the first memory location is to a cached memory location.

7. A non-transitory machine-readable medium having stored thereon data representing sequences of instructions that, when executed by a processor, cause the processor to perform operations comprising:
monitoring a first memory location by a first processor;
writing, by a second processor, an inter-processor interrupt request to a first memory location, wherein the first and second processors are general purpose processors of same type within a multi-processor computer system;
detecting, by the first processor, the inter-processor interrupt request in the first memory location, the first processor saving its state and executing a call instruction in response to the detecting, the call instruction specifying an address of an interrupt service routine to invoke said interrupt service routine, said address of said interrupt service routine having been made available to said first processor through a boot-up registration process;
performing, by the first processor, the interrupt service routine for the inter-processor interrupt request;
monitoring, by the second processor, a second, different memory location for acknowledgement of receipt of the inter-processor interrupt request; and
writing, by the first processor, to the second memory location to acknowledge receipt of the inter-processor interrupt request,
wherein the first memory location is accessible by a plurality of first processors, the plurality of first processors to monitor the first memory location to detect the inter-processor interrupt request, the first memory location being a single memory address.

8. The medium of claim 7, wherein the operations further comprise establishing, by the first processor, a state for enabling ring transition on detection of the inter-processor interrupt request.

9. The medium of claim 7, wherein the first memory location is a linear memory location.

10. The medium of claim 7, wherein the operations further comprise writing, by the second processor, the inter-processor interrupt request to a plurality of memory locations, each of the plurality of memory locations to be monitored by one or more processors.

11. The medium of claim 7, wherein the memory write to the first memory location is to a cached memory location.

12. An apparatus comprising:
a first processor including an execution unit to cause a memory write to a first memory location; and
a second processor including circuitry to save said second processor's state and execute an instruction that causes a call to an interrupt service routine in response to detection of the memory write, the instruction that causes the call to the interrupt service routine to specify an address for the interrupt service routine, the address for the interrupt service routine to be provided to said second processor through a boot-up registration process, wherein the first and second processors are general purpose processors of a same type within a multi-processor computer system,
wherein the second processor is to write to a second, different memory location to acknowledge the memory write, and wherein the first processor is to monitor the second, different memory location for the acknowledgement, and wherein the first memory location is accessible by a plurality of second processors, the plurality of second processors to monitor the first memory location to detect the memory write.

13. The apparatus of claim 12, wherein the call is to be registered at a boot time.

14. The apparatus of claim 12, wherein the memory write is to a cached memory location.

15. The apparatus of claim 12, wherein the state is to be saved in kernel mode.

\* \* \* \* \*